United States Patent [19]
Bugnon

[11] Patent Number: 5,858,080
[45] Date of Patent: Jan. 12, 1999

[54] BISMUTH VANADATE PIGMENTS

[75] Inventor: Philippe Bugnon, Essert, Switzerland

[73] Assignee: Ciba Specialty Chemicals Corporation, Tarrytown, N.Y.

[21] Appl. No.: 863,311

[22] Filed: May 27, 1997

[30] Foreign Application Priority Data

May 31, 1996 [CH] Switzerland .............. 1369/96

[51] Int. Cl.⁶ .................................. C04B 14/00
[52] U.S. Cl. ..................... 106/479; 106/499
[58] Field of Search ................... 106/479, 499

[56] References Cited

U.S. PATENT DOCUMENTS

| | | | |
|---|---|---|---|
| 3,843,554 | 10/1974 | Aykan et al. | 252/468 |
| 4,115,142 | 9/1978 | Hess | 106/461 |
| 4,272,296 | 6/1981 | Balducci et al. | 106/461 |
| 4,316,746 | 2/1982 | Rustioni et al. | 106/461 |
| 4,455,174 | 6/1984 | Wienand et al. | 156/288 |
| 4,752,460 | 6/1988 | Herren | 423/593 |
| 4,851,049 | 7/1989 | Wienand et al. | 106/479 |
| 4,997,870 | 3/1991 | Schilling et al. | 524/423 |
| 5,203,917 | 4/1993 | Schwochow | 106/479 |
| 5,336,312 | 8/1994 | Byrne et al. | 106/479 |
| 5,399,197 | 3/1995 | Vermoortele et al. | 106/479 |
| 5,536,309 | 7/1996 | Etzrodt et al. | 106/479 |

FOREIGN PATENT DOCUMENTS

| | | |
|---|---|---|
| 0232512 | 8/1987 | European Pat. Off. . |
| 0441101 | 8/1991 | European Pat. Off. . |
| 1077422 | 7/1967 | United Kingdom . |
| 1408842 | 10/1975 | United Kingdom . |
| 96/36668 | 11/1996 | WIPO . |

OTHER PUBLICATIONS

Derwent Abstract 81–82629d of JP 56–122875A (Sep. 1981).
The Bulletin of the Bismuth Institute, Bismuth–Vanadate Pigments in Paints, No. 68, 1995, 1–3 (No Month).
Chem. Abstr. 83(8):62038r (Nov. 1974).
Chem. Abstr. 77(4):21651t (1972) (No Month).
Chem Abst. 113(20):173457j (May 1990).
Chem. Abst. 87(20):153532W (Jun. 1977).
Industrial Inorganic Pigments, Buxbaum, p. 114 (1993) (No Month).

*Primary Examiner*—Mark L. Bell
*Assistant Examiner*—Scott L. Hertzog
*Attorney, Agent, or Firm*—Kevin T. Mansfield

[57] ABSTRACT

Bismuth vanadate pigments, the particle surface of which is coated with 1 to 20% by weight of polyvinyl alcohol, based on the amount of pigment. Bismuth vanadate pigments of this kind are distinguished, in particular in aqueous paint systems, by excellent tinctorial strength and chroma as well as by the high gloss of the finishes obtained therewith.

9 Claims, No Drawings

BISMUTH VANADATE PIGMENTS

The present invention relates to bismuth vanadanate pigments coated with polyvinyl alcohol. Said pigments are distinguished by high tinctorial strength and saturation and, in particular in aqueous automotive paint systems, by a remarkable gloss of the finishings.

Bismuth vanadates have been known for a long time, and the possibility of using them as pigments was recognised in the seventies, as emerges from G. Buxbaum, Industrial Inorganic pigments, VCH-Verlag (1993) and, inter alia, from U.S. Pat. No. 3,843,554 and 4,115,142. They are highly valued in particular because of their low toxicity and their good coloristic properties. In the course of the past few years, innummerable methods have been developed to further improve their properties, e.g. by partially replacing Bi and V with other metals or nonmetals, or by coating them with inorganic or organic substances. Such methods are disclosed, inter alia, in U.S. Pat. No. 5,536,309, U.S. Pat. No. 4,115,142, U.S. Pat. No. 4,272,296, U.S. Pat. No. 4,316,746, U.S. Pat. No. 4,455,174, U.S. Pat. No. 5,203,917, U.S. Pat. No. 5,336,312, U.S. Pat. No. 5,399,197, U.S. Pat. No. 4,752,460 and EP 441 101.

The use of polyvinyl alcohol with organic and inorganic pigments in water colours, size colours and paper coating colours to improve their dispersibility and storage stability is known, inter alia, from CA 113(20);173457j, CA 87(20):153532w, GB 1 077 422, GB 1 408 842 and U.S. Pat. No. 4,997,870. Iron oxides, Cd yellow, lead chromates, $TiO_2$, chalk, gypsum and carbon black are mentioned as inorganic pigments. CA83(8):62038r describes a mixture for spray coating automotive parts, consisting of $CaCO_3$, $BaSO_4$, $TiO_2$, silica gel or polyethylene terephthalate and a water-soluble polymer, such as polyvinyl alcohol. If a layer obtained with such a mixture is coated with a water-insoluble plastic coating, then a coating is obtained having enhanced resistance against dirt and scratches. According to CA77(4):21651t, the rheology of aqueous paint systems can be improved by using, for example, polyvinyl alcohol, vinyl acetate/crotonic acid copolymer, sodium alginate, and others.

Entirely surprisingly, it has now been found that by coating bismuth vanadate pigments with polyvinyl alcohol it is possible to improve the tinctorial strength and chroma (saturation) of the pigments and the gloss of the colorations obtained therewith, in particular in aqueous automotive paint systems.

Accordingly, this invention relates to bismuth vanadate pigments, the particle surface of which is coated with 1 to 20% by weight of polyvinyl alcohol, based on the amount of pigment.

The bismuth vanadate pigments are preferably those of the general composition $Bi_2O_3 \times V_2O_5$, 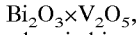

wherein bismuth and vanadium may be partially replaced with other metals or nonmetals. These bismuth vanadate pigments are known.

The metals and nonmetals which may partially replace bismuth and vanadium are preferably Li, Mg, Zn, Al and, in particular, Ca, and also W and, in particular, P and Mo.

Said bismuth vanadate pigments are preferably commercially available bismuth vanadate pigments which are called C.I. pigment Yellow 184 (see The Bulletin of the Bismuth Institute 68,1995).

Suitable polyvinyl alcohols are the polyvinyl alcohols which are commonly known and which may be modified by esters, ethers or acetal groups, as well as polyvinyl alcohol-containing copolymers, such as block copolymers containing polyvinyl alcohol segments. It is convenient to use commercially available polyvinyl alcohols having a degree of hydrolysis above 80%, preferably from 86 to 99.8%, and a degree of polymerisation from 200 to 2500, preferably from 250 to 1800.

The bismuth vanadate pigments of this invention may be prepared in simple manner, typically by aftertreating, with stirring, the pigment to be treated in an aqueous suspension with the polyvinyl alcohol. The starting material in this case may be the dry pigment powder, a press cake or a suspension obtained from the synthesis. Before being added, the polyvinyl alcohol can either be dissolved with water or it may be added to the pigment suspension in solid form. If required, the suspension can be dispersed by customary methods in a dispersing aggregate (e.g. in a high-pressure homogeniser or in a high-speed stirrer). In most cases this is not necessary because polyvinyl alcohols normally have very good wetting properties. The pigment content in the suspension may be varied within wide limits and may be up to 40% by weight. It is expedient to use suspensions comprising 5 to 20% by weight of pigment. The aftertreatment of the pigment with polyvinyl alcohol can be carried out at room temperature, or also at an elevated temperature up to about 80° C. The stirring time varies from 1 to 20 hours. As mentioned above, the amount of the polyvinyl alcohol to be added to the suspension is from 1 to 20, but preferably from 3 to 10% by weight, based on the amount of pigment.

The bismuth vanadate pigments of this invention are suitable for pigmenting high molecular weight organic material.

High molecular weight organic materials which can be pigmented with the novel bismuth vanadates are, for example, cellulose ethers and cellulose esters, typically ethyl cellulose, nitrocellulose, cellulose acetate and cellulose butyrate, natural resins and synthetic resins, such as polymerisation resins or condensation resins, e.g. aminoplasts, preferably urea/ formaldehyde resins and melamine/ formaldehyde resins, alkyd resins, phenoplasts, polycarbonates, polyolefins, such as polyethylene and polypropylene, polystyrene, polyvinyl chloride, polyacrylonitrile, polyacrylate, polyamides, polyurethanes, polyesters, rubber, casein, silicone and silicone resins, singly or in admixture.

It is irrelevant whether the above high molecular weight organic compounds are obtained as plastic materials, melts or in the form of spinning solutions, paints, coating materials or printing inks. Depending on their envisaged end use, it is advantageous to use the novel bismuth vanadates as toners or in the form of preparations. The novel bismuth vanadates may be used in an amount of 0.01 to 30% by weight, preferably of 0.1 to 10% by weight, based on the high molecular weight organic material to be pigmented.

In addition to their extraordinarily high chroma and transparency, the colorations obtained in, for example, plastic materials, fibres, paints or prints, are distinguished by their high tinctorial strength, good dispersibility, resistance to re-coating, migration, heat, light and weathering, as well as by their good gloss.

However, as mentioned above, the novel bismuth vanadates are very particularly distinguished by their high tinctorial strength and chroma as well as by their high gloss when used in solvent-containing and, in particular, in aqueous paint systems, in particular in automotive paint systems.

The invention is further illustrated by the following Examples in which percentages are by weight, unless otherwise stated.

Example 1

345.6 g of a 39.1% press cake of bismuth vanadate pigment (C.I. pigment Yellow 184) are dispersed with 6.75 g of polyvinyl alcohol ®MOWYOL 3/83 (Hoechst) in 998 g of water over 3 hours. The pigment suspension is then filtered, the residue is washed twice with 2l of water and dried in a vacuum drying oven at 80° C.

Example 2

13.1 g of the product of Example 1 are incorporated into a paint system consisting of 10 g of polyester binder (25% solids content)

0.15 g of dispersant ®ESURFYNOL CT 136 (Air Products and Chem. Inc., USA) and 1.62 g of water.

This mill base formulation is dispersed with 100 g of 1 mm glass beads with a ®DISPERMAT CV first for 10 minutes at 1000 rpm and then for 30 minutes at 3000 rpm. To this mixture are added 66.7 g of a polyacrylate dispersion (25% solids content)

38.5 g of water 5.6 g of butyl glycol, and 0.3 g of dimethylethanolamine.

5 g of the coloured paint so obtained are extended with 20 g of a corresponding white paint which is prepared using $TiO_2$ instead of the coloured pigment. After stirring thoroughly, this paint is coated thinly with a coating knife (150 mμ) onto a polyethylene film and after 30 minutes it is dried for a further 30 minutes in an oven.

The finish so obtained and a corresponding finish obtained with untreated bismuth vanadate pigment were compared with respect to their tinctorial strength, saturation (chroma C*) and gloss.

The tinctorial strength of the standard (finish with untreated bismuth vanadate pigment) is determined using a Zeiss spectrophotometer according to DIN 53234 and the value 100 is accorded. The test sample (finish with novel pigment) is evaluated in comparison therewith.

Chroma C* is determined in accordance with CIELAB norms.

The gloss is determined using a reflectometer (Zehntner ZGM 1020®) at an angle of 20° according to DIN 67530. The results are given in the following Table:

|  | Tinctorial strength | Chroma C* | Gloss |
|---|---|---|---|
| untreated pigment | 100 | 43.8 | 41% |
| novel pigment | 134 | 47.9 | 58% |

What is claimed is:

1. A bismuth vanadate pigment, the particle surface of which is coated with 1 to 20% by weight of polyvinyl alcohol, based on the amount of pigment.

2. A bismuth vanadate pigment according to claim 1, in which the bismuth vanadate is of the general composition $Bi_2O_3 \times V_2O_5$, wherein bismuth and vanadium may be partially replaced with other metals or nonmetals.

3. A bismuth vanadate pigment according to claim 2, wherein the metals and nonmetals which may partially replace bismuth and vanadium are Li, Mg, Zn, Al, Ca, and also W, P and Mo.

4. A bismuth vanadate pigment according to claim 3, wherein the metals and nonmetals are Ca, P or Mo.

5. A bismuth vanadate pigment according to claim 1, wherein the bimuth vanadate is that which is known as C.I. pigment Yellow 184.

6. A bismuth vanadate pigment according to claim 1, the particle surface of which is coated with 3 to 10% by weight of polyvinyl alcohol, based on the amount of pigment.

7. A bismuth vanadate pigment according to claim 1, wherein the polyvinyl alcohol has a degree of hydrolysis of above 80% and a degree of polymerisation from 200 to 2500.

8. A high molecular weight organic material pigmented with a bismuth vanadate pigment as claimed in claim 1.

9. A high molecular weight organic material according to claim 8, which is an aqueous paint system.

* * * * *